(12) United States Patent
Monopoli et al.

(10) Patent No.: US 8,490,759 B2
(45) Date of Patent: Jul. 23, 2013

(54) DRUM BRAKES

(75) Inventors: Marco Monopoli, Millesimo (IT); Ivan Cecchelli, Vado Ligure (IT)

(73) Assignee: Automotive Products Italia (SV) S.R.L. (IT)

( * ) Notice: Subject to any disclaimer, the term of this patent is extended or adjusted under 35 U.S.C. 154(b) by 1368 days.

(21) Appl. No.: 12/086,460

(22) PCT Filed: Dec. 8, 2006

(86) PCT No.: PCT/IB2006/003907
§ 371 (c)(1),
(2), (4) Date: Jun. 12, 2008

(87) PCT Pub. No.: WO2007/069075
PCT Pub. Date: Jun. 21, 2007

(65) Prior Publication Data
US 2009/0159379 A1    Jun. 25, 2009

(30) Foreign Application Priority Data
Dec. 15, 2005    (GB) .................................. 0525585.6

(51) Int. Cl.
*F16D 65/56*    (2006.01)
*F16D 65/14*    (2006.01)

(52) U.S. Cl.
USPC ............ 188/196 BA; 188/71.3; 188/79.58; 188/79.63; 188/196 R; 188/206 A; 188/216; 188/328; 188/338; 188/339; 188/340

(58) Field of Classification Search
USPC ..... 188/196 R, 196 BA, 72.9, 73.1, 327–328, 188/340, 79.51, 335, 341, 336, 325, 330, 188/205 R IPC ............ F16D 51/20,65/54, 51/10, 51/12, 51/14, F16D 51/16, 65/09
See application file for complete search history.

(56) References Cited

U.S. PATENT DOCUMENTS

| | | | | |
|---|---|---|---|---|
| 2,116,174 A | | 5/1938 | Kay | |
| 2,288,146 A | * | 6/1942 | Sinclair | 188/327 |
| 4,552,254 A | * | 11/1985 | Baltare | 188/328 |
| 4,993,525 A | * | 2/1991 | Hyde | 188/328 |

(Continued)

FOREIGN PATENT DOCUMENTS
WO    WO01/34992    5/2001

OTHER PUBLICATIONS

International Search Report corresponding to International Application No. PCT/IB2006/003907, dated Jul. 18, 2007.

*Primary Examiner* — Robert A Siconolfi
*Assistant Examiner* — San Aung
(74) *Attorney, Agent, or Firm* — RatnerPrestia (57) ABSTRACT

A drum brake (10) is provided which has a pair of brake pads (12), each pad being moveable generally radially outwardly into contact with a brake drum by a respective operating lever (14) which is acted on at one end by a brake applying means (15) and pivoted (16) at the other end from a backplate (11). Each pad is contacted by a portion (14c) of the respective operating lever intermediate the lever ends and is moved radially outwardly between a pair of circumferentially spaced abutments (45) which extend generally perpendicular to the backplate (11) and which react braking torque when the brake is applied. The required pad to drum clearance is established by knock-back of the drum on the pads (12).

13 Claims, 7 Drawing Sheets

U.S. PATENT DOCUMENTS 6,705,439 B1 * 3/2004 Wang .................... 188/340
2003/0006105 A1 * 1/2003 Wang .................. 188/79.51
2004/0069577 A1 * 4/2004 Girini et al. ............ 188/79.51
2005/0205367 A1 * 9/2005 Dupuis ................... 188/72.9

* cited by examiner

DRUM BRAKES

This application claims priority of PCT International Application No. PCT/IB2006/003907, filed on Dec. 8, 2006, which claims priority to Great Britain Patent Application No. 0525585.6, filed Dec. 15, 2005.

FIELD OF THE INVENTION

This invention relates to drum brakes.

BACKGROUND OF THE INVENTION

The Applicant's own earlier filed British patent applications 0507470.3 and 0523107.1 are concerned with drum brakes comprising a pair of brake pads, each pad being moveable generally radially outwardly into contact with a brake drum by a respective operating lever acted on at one end by a brake applying means and pivoted at the other end from a backplate, each pad being contacted by a portion of the respective operating lever intermediate the lever ends and moving radially outwardly between a pair of circumferentially spaced abutments which extend generally perpendicular to the backplate and which react braking torque when the brake is applied. Such drum brakes are referred to hereinafter as being "of the kind described".

SUMMARY OF THE INVENTION

A drum brake of the kind described may operate as a service brake only, when the operating levers are moved by a brake applying means such as a hydraulic cylinders, and/or may provide a hand or parking brake function when a handbrake lever is pivoted on one of the operating levers adjacent said one end thereof and a strut extends between said hand brake lever and said one end of the operating lever so that pivoting of the handbrake lever relative to said one operating lever moves the other operating lever towards its associated pad and thus, by reaction through the strut, also moves said one operating lever towards its associated pad thus applying the brake to provide a hand/parking brake function.

It is an object of the present invention to provide an improved form of drum brake of the kind described.

Thus according to the present invention there is provided a drum brake of the kind described in which, when the brake is released, the required pad to drum clearance is established by knock-back of the drum on the pads.

With such an arrangement, where no pad retraction springs are used, it is possible to run the pads at a significantly reduced pad to drum clearance (e.g. 0.1 to 0.15 mm instead of 0.4 to 0.6 mm) thus significantly improving the response of the brake.

If the brake includes a hand/parking brake function as referred to above with a handbrake lever pivoted on one of the operating levers, the strut which extends between the operating levers may conveniently include an automatic pad clearance adjuster which adjusts the effective length of the strut as the pads wear to adjust pad clearance.

Preferably, but not necessarily essentially, the brake is also provided with the linked reaction abutments which are the subject of the Applicant's earlier British patent application No. 05 07470.3.

The brake may also, but not necessarily essentially, be provided with the bracing link extending between the operating lever pivots which is the subject of the Applicant's earlier British patent application No. 0523107.1.

The brake applying means may be hydraulic or electrical.

BRIEF DESCRIPTION OF THE DRAWINGS

The present invention will now be described, by way of example only, with reference to the accompanying drawings in which.

DETAILED DESCRIPTION

Figures 1, 1A:
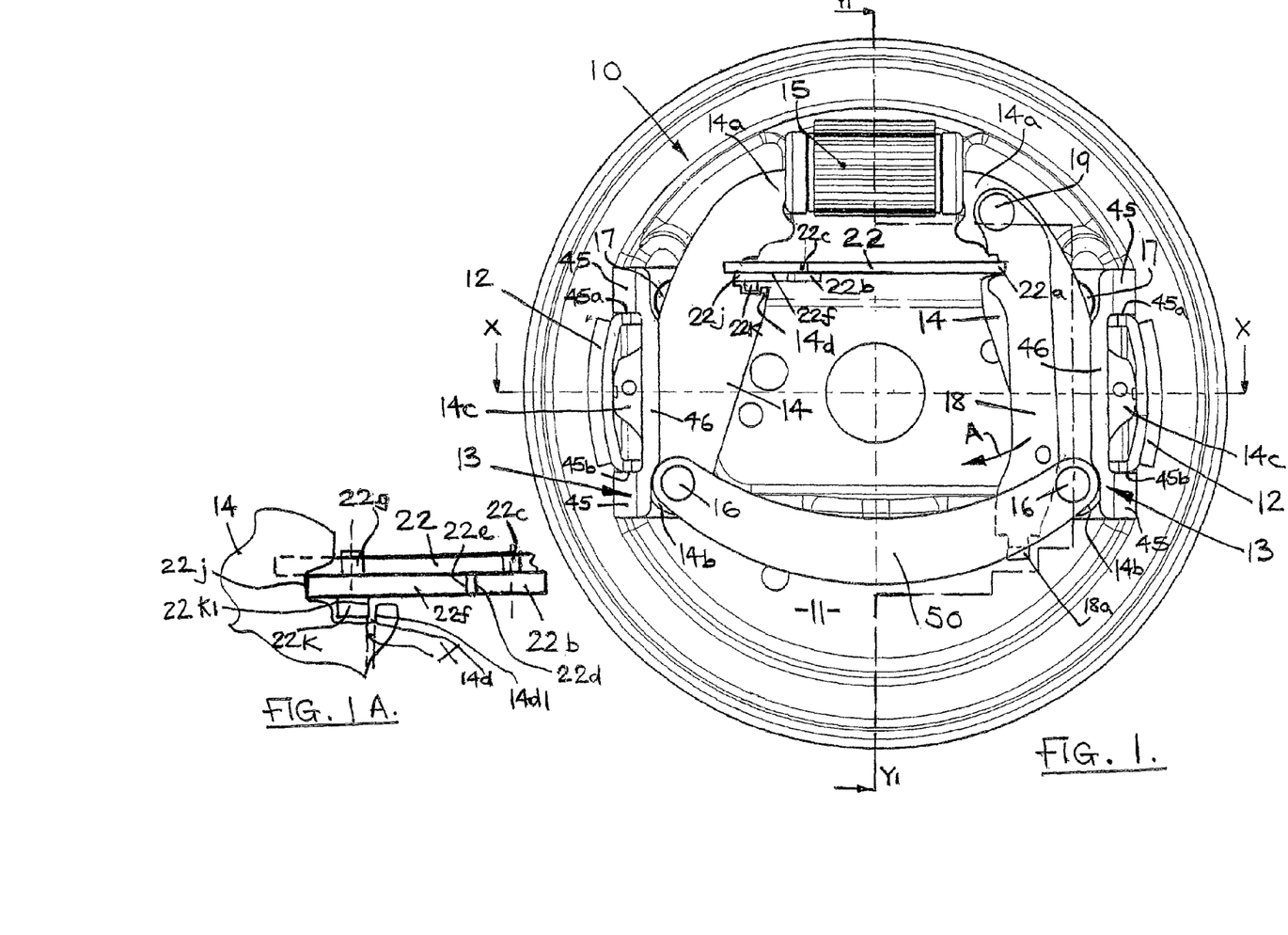
FIG. 1 shows a side view of a brake in accordance with the present invention with the drum removed.
FIG. 1A shows a scrap view of part of an adjusting strut use in the brake of FIG. 1.

Referring to the drawings, a brake 10 has a backplate 11 on which a pair of brake pads 12 are supported for generally radially outward movement into contact with a associated brake drum (not shown) by abutment structures 13. Each pad is moved radially outward into contact with the drum by an associated operating lever 14 which is acted on at its upper end 14a by a service brake applying means in the form of a hydraulic wheel cylinder 15. The lower end 14b of each operating lever is pivoted on the associated abutment structure 13 by a pivot pin 16 which is also used together with a further rivet pin 17 to secure the abutment structure 13 to the backplate 11.

Pivoted on the right-hand operating lever 14 by a rivet 19 is a handbrake lever 18. The handbrake lever has a U-shaped lower portion 18a which engages with a nipple (not shown) on the end of a handbrake operating cable in a conventional manner. Alternatively, any other form of connection of the hand brake operating cable to the lower end 18a of lever 18 can be employed. For example, the quick attach arrangement shown in the Applicants patent EP 917630 is suitable.

Figure 6:
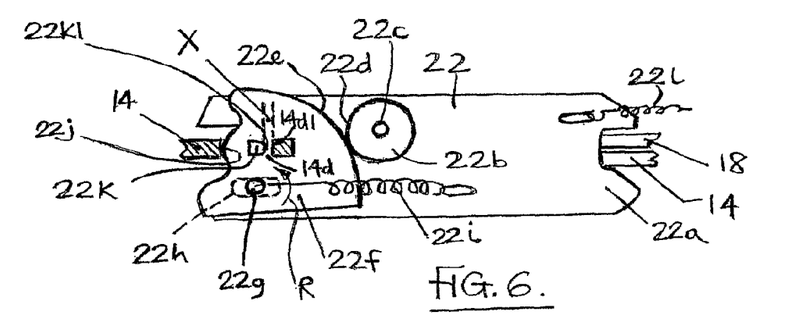
FIG. 6 shows an under plan view of an automatic brake clearance adjusting strut used in the present invention.

The handbrake lever 18 and the associated operating lever 14 both engage one end 22a of a brake pad clearance adjusting strut 22 (see FIG. 6). Strut 22 carries a wheel 22b which is pinned to strut 22 at 22c. The wheel has a knurled edge 22d when engages a knurled edge 22e on an eccentric cam member 22f which is pivoted on strut 22 by a pin 22g which slides in a slot 22h in the strut. A spring 22i biases the knurled teeth on cam 22f into contact with the knurled teeth on wheel 22b to hold cam 22f against pivoting on pin 22g. Cam 22f has a contact zone 22j which contacts the other operating lever 14. There is also a projection 22k on cam 22f which engages in a cut-out 14d in the associated operating lever (see FIG. 1A). There is a defined clearance X between an edge 22k1 of projection 22k and an edge 14d1 of the cut-out 14d. A spring 22l holds strut 22 in contact with the adjacent lever 14.

When the pads 12 are applied against the associated drum by the cylinder 15 the two operating levers 14 are moved apart. As the pads 12 wear this movement of the levers 14 apart increases until, after a predetermined amount of wear of the pads has taken place, (determined by clearance X) the edge 22K1 of projection 22K contacts edge 14d1 of the cut-out 14d and causes rotation of cam 22f about pin 22g as indicated by arrow "R" in FIG. 6 thus causing the knurled edges on cam 22f and wheel 22b to move relative to each other thereby effectively moving contact zone 22j to the left as viewed in FIG. 6 thus increasing the effective length of strut 22 between levers 14 and limiting the retraction capability of pads 12 when the brake is released.

As in well known, when lever 18 is pivoted about rivet 19 in a clockwise sense as indicated by arrow A lever 18 pushes on strut 22 which in turn pivots lever left-hand lever 14 its about pivot 16 to force left-hand pad 12 into contact with the associated drum. The reaction force of left-hand pad 12 contacting the shoe is transmitted to right-hand lever 14b via pivot pin 19 through strut 22 thus also forcing right-hand brake pad 12 to engage the associated drum so that a full handbrake function is generated.

The action of the adjustable length strut 22 ensures that the movement of handbrake lever 18 required to fully apply the handbrake function remains substantially constant as the pads 12 wear As will be appreciated, if, for example, the brake is to be used on a wheel where no handbrake function is required, lever 18 and the strut 22 may be eliminated and the pad to drum clearance on the service brake function is maintained by knock back of the pads 12 when the brake is released.

The adjustable length strut 22 may be provided with a temperature sensitive device (not shown) which disables the operation of the adjustment of the effective length of the strut at high temperatures to prevent over adjustment of the pad clearance.

Figure 2:
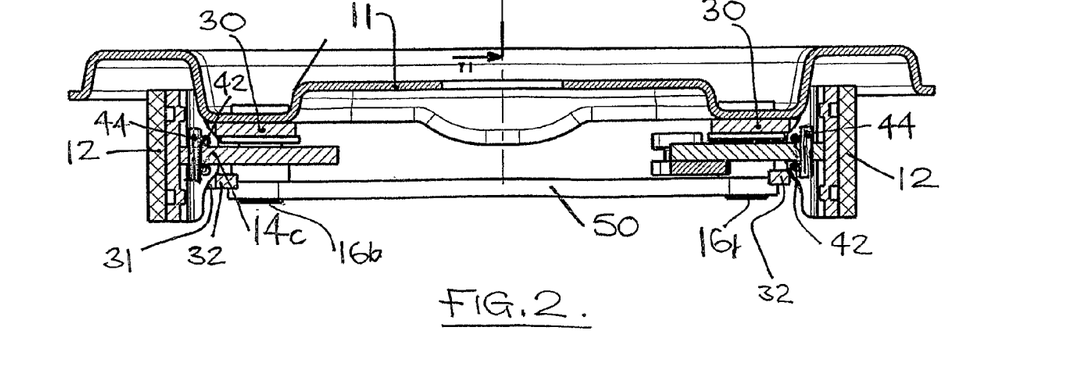
FIG. 2 shows a section on the line X-X of FIG. 1.
Figure 3:
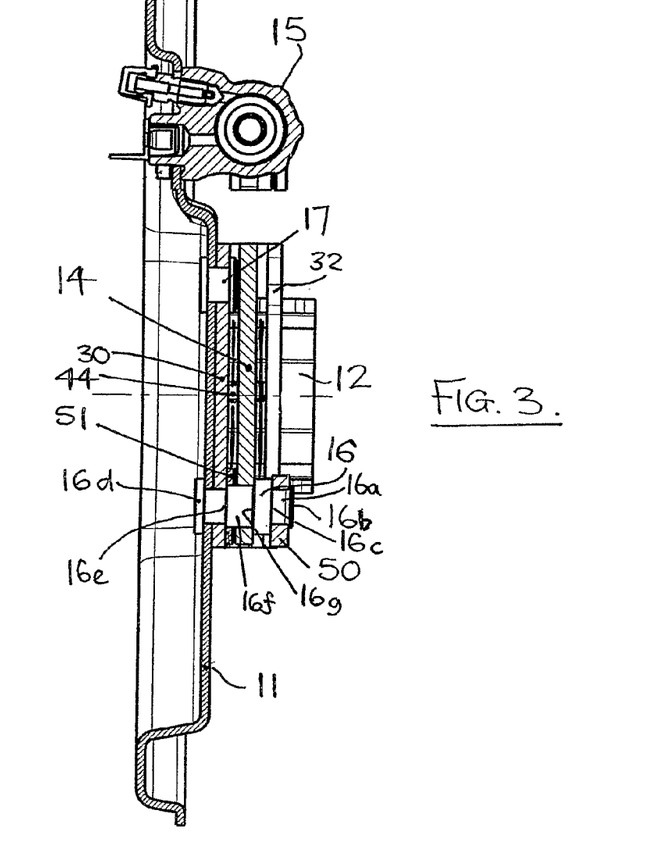
FIG. 3 shows a section on the line Y1-Y1 of FIG. 1.
Figure 4:
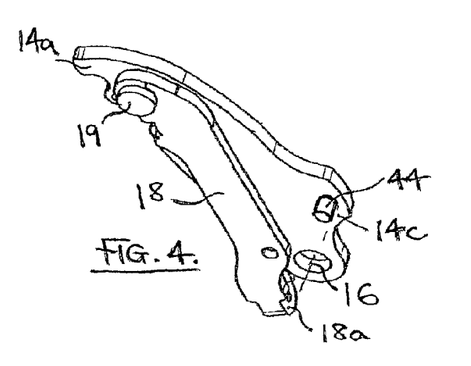
FIG. 4 shows a perspective view of a pad operating lever and associated handbrake lever which form part of the brake of FIG. 1.
Figure 7:
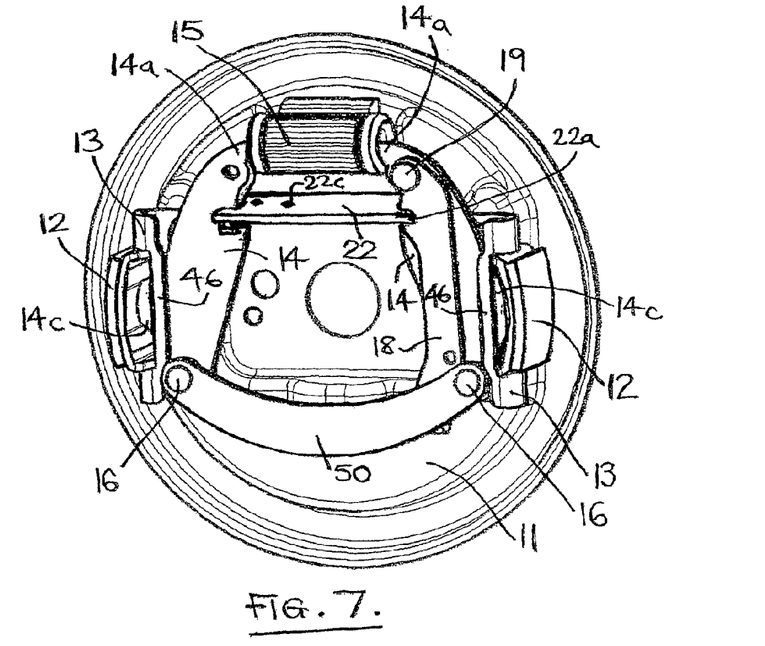
FIG. 7 shows a perspective view of the brake shown in FIG. 1.
Figure 8:
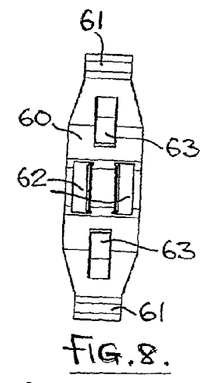
FIGS. 8, 9, 10, 10A, 11 and 12 show views of a spring clip used to secure a brake pad to an associated operating lever in accordance with the invention.
Figures 9, 12, 13, 14:
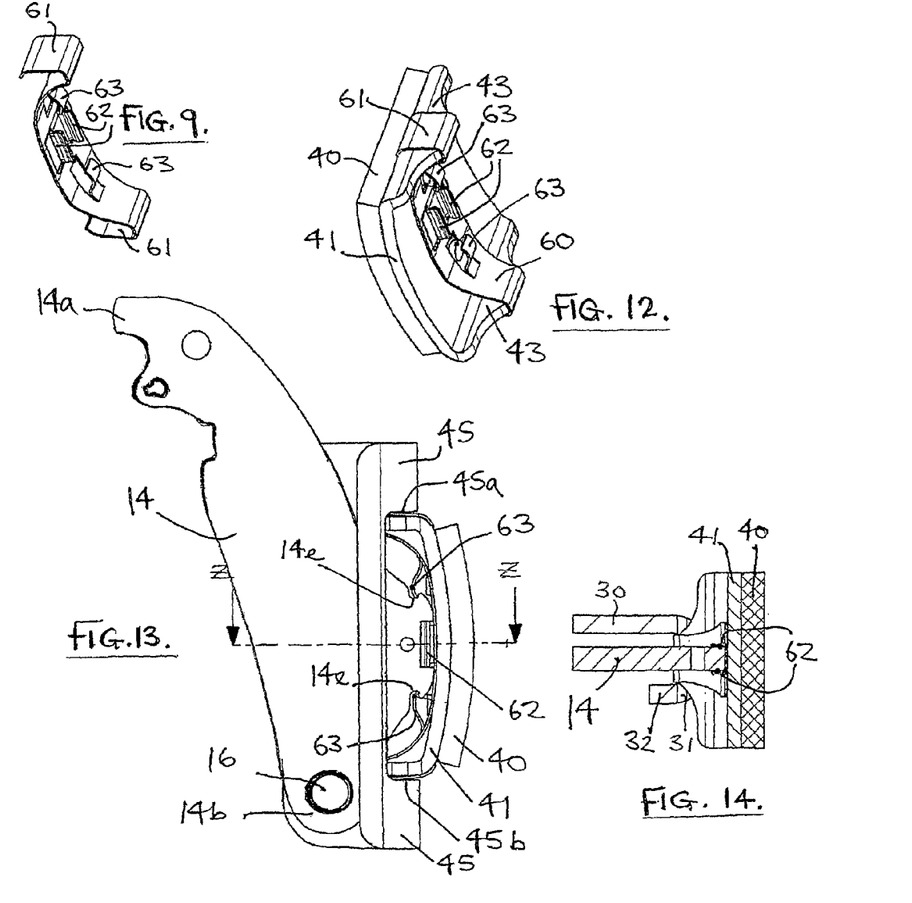
FIG. 13 shows, on a larger scale, details of the brake pad, abutment and operating lever arrangement of the present invention.
FIG. 14 shows a section on the line Z-Z of FIG. 13.

As best seen in FIGS. 2, 3 and 7, each abutment structure 13 is formed as a generally U-shaped channel structure with one side 30 contacting the backplate 11 and the base of the channel having an aperture 31 through which a portion 14c of the respective operating lever 14 extends.

Figure 5:
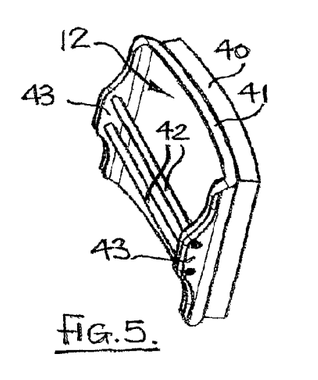
FIG. 5 shows a perspective view of a brake pad used in the present invention.

As shown in FIG. 5, each brake pad 12 comprises a friction pad 40 and a metal backing/support member 41. Each support member 41 has a pair of locating rods 42 which extend between ears 43. Locating rods 42 are used to secure pad 12 to its associated operating lever 14 using a removable roll pin 44 as best seen in FIG. 2. The ears 43 of the pad supports 41 contact abutment surfaces 45a or 45b on the abutment structures 13 when the brake is applied depending on the direction of rotation of the drum. This contact reacts the braking torque generated.

The abutment surfaces 45a and 45b are provided on abutment portions 45 of each abutment structure 13 and extend across the base of the abutment structure and into the sides of the U-shaped structure adjacent the base to provide a good balanced contact area between the pads 12 and the abutment structure 13. These abutments portions 45 are linked circumferentially by portion 46 of the abutment structure which forms the opposite side 32 of the U-shaped channel structure. This link 46 between the abutment portions 45 (which is the subject of the Applicant's previously referred to British application No. 05 07470.3 braces the abutment portions against relative circumferential deflection when the brake is applied thus better resisting the braking torque generated and providing a more robust and rigid brake structure.

Figure 20:
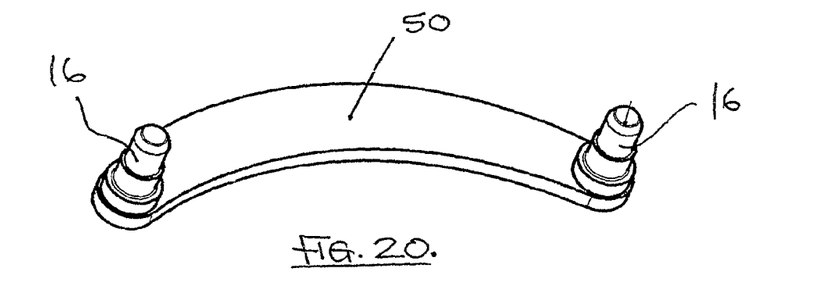
FIG. 20 shows the bracing link of the present invention.

In accordance with the Applicant's previously referred to British application No. 0523107.1, the pins 16 which pivotally mount the levers 14 on the backplate are connected by a bracing link 50 (see FIG. 20) which extend between the free ends 16a of the pins 16 to help to control the deflection of the pins 16 relative to the backplate when the brake us applied. The bracing link 50 is curved to increase the clearance around the hub of the associated wheel. In certain installation there may be sufficient space for link 50 to be straight in form.

Figure 21:
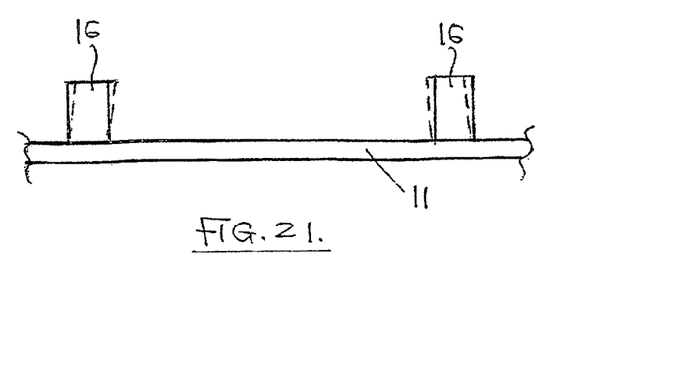
FIG. 21 shows in diagrammatic form the deflection of the lever pivots in a brake which does not have the bracing link of the present invention.

FIG. 21 shows diagrammatically the tendency of the free ends 16a of the pins 16 to deflect towards each other when the brake is applied (shown in dotted detail). By providing the bracing link 50 this tendency is significantly reduced and thus the stiffness of the brake is greatly improved. This significantly improves the response of the brake since the loss of actuating displacement which occurs (as a result of the deflection of pins 16) if the bracing link 50 is not used is reduced. Also the reduction of the deflection of the mounting pins 16 relative to the backplate 11 helps to reduce the likelihood of any failure of the mounting of the pins on the backplate. The improved stiffness of the brake also allows the thickness of the backplate to be reduced (e.g. from 2.5 mm to 2.0 mm) this significantly reduces the material costs of the brake.

Figure 22:
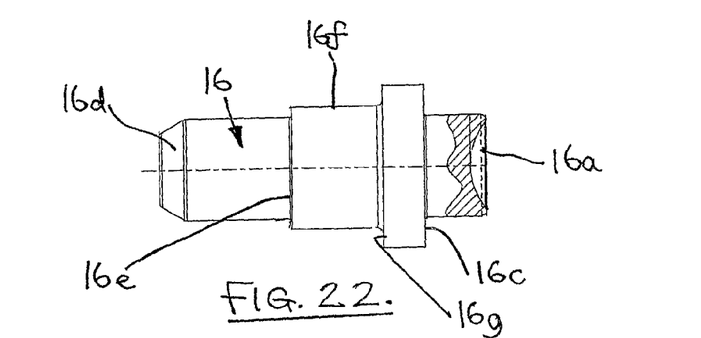
FIG. 22 shows details of the operating lever pivot pins of a brake in accordance with the present invention.

FIG. 22 shows the detail of one of the pins 16. The free end 16a of the pin is riveted over at 16b (see FIG. 3) to secure the bracing link 50 against a first shoulder 16c on each pin. When the brake is assembled the other end of each pin 16 is riveted against 16 backplate 11 at 16d to sandwich the side 30 of each abutment structure 13 between the backplate and a second shoulder 16e on each pin. Lever 18 is pivoted on portion 16f of each pin between a spacing washer 51 and a third shoulder 16g of each pin.

Figure 23:
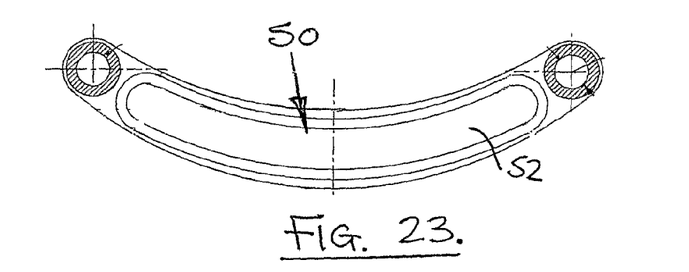
FIG. 23 and 24 show details of an alternative pressed metal bracing link of the present invention.
Figure 24:
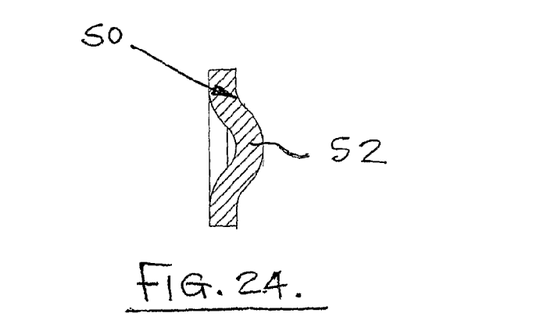

FIGS. 23 and 24 show an alternative form of bracing link 50 which is formed by pressing and which includes a longitudinally extending stiffening formation in the form of a pressed ridge 52.

In accordance with the present invention no pad retraction springs are provided. Thus, when the brake is released either by releasing the pressure in wheel cylinder 15 or by releasing handbrake lever 18 if the handbrake function has been applied, the running clearances between the pads 12 and the internal surface of the associated drum are established solely by knock-back between the friction surfaces of the pads and the internal surface of the drum. This enables the pads to be operated at significantly reduced clearances from the drum (i.e. clearances of say 0.1 to 0.15 mm as compared to 0.4 to 0.6 mm when retraction spring are used as described in the Applicant's previously referred to British patent application No. 0507470.3 and 0523107.1).

As will be appreciated, when a hydraulic wheel cylinder 15 is used, the natural resilience of the seals on the piston or pistons in the cylinder will tend to withdraw the piston or pistons slightly when the hydraulic pressure is released thus also aiding pad retraction.

The knock-back feature of the present invention can also be used in a brake which only has a service function provided by cylinder 15 and which does not include a handbrake lever 18. In such an arrangement the strut 22 may be omitted and knock back used to maintain pad clearance.

FIGS. 8 to 14 show an alternative arrangement in which each brake pad 12 is secured to the associated lever 14 using a spring clip 60. The ends 61 of each clip are arranged to grip around the ears 43 of each pad to secure the clip to the pad. The clip has tongues 62 which extend on either side of the associated operating lever portion 14c to help locate the pad in direction at right angles to the backplate. A further pair of tongues 63 are provided on clip 60 which clip into notches 14e provided on the associated operating lever to secure the pad to the operating lever.

Figures 10, 10A, 11:
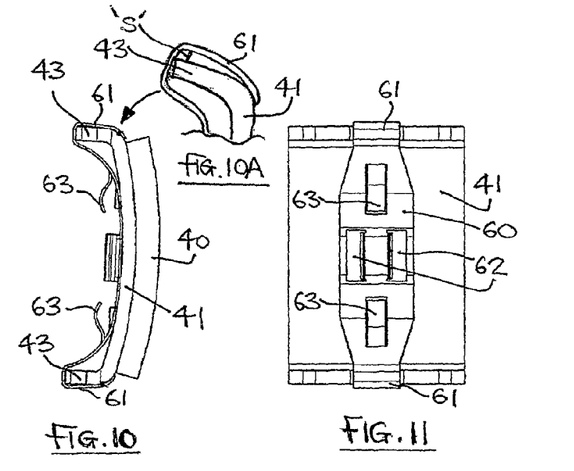

Also, as can be seen from FIG. 10A the end portions 61 of the spring clip are spaced a small distance S from the brake pad support member ears 43. The end portions 61 of the spring clip are arranged to contact the abutment surfaces 45a and 45b on the abutment portions 45. Thus a resilient contact is provided between the brake pads and the abutment portions as the small clearance S is closed when the brake pad is moved slightly circumferentially on contacting the associated drum. This resilient contact helps to reduce brake pad vibration/noise.

Figure 15:
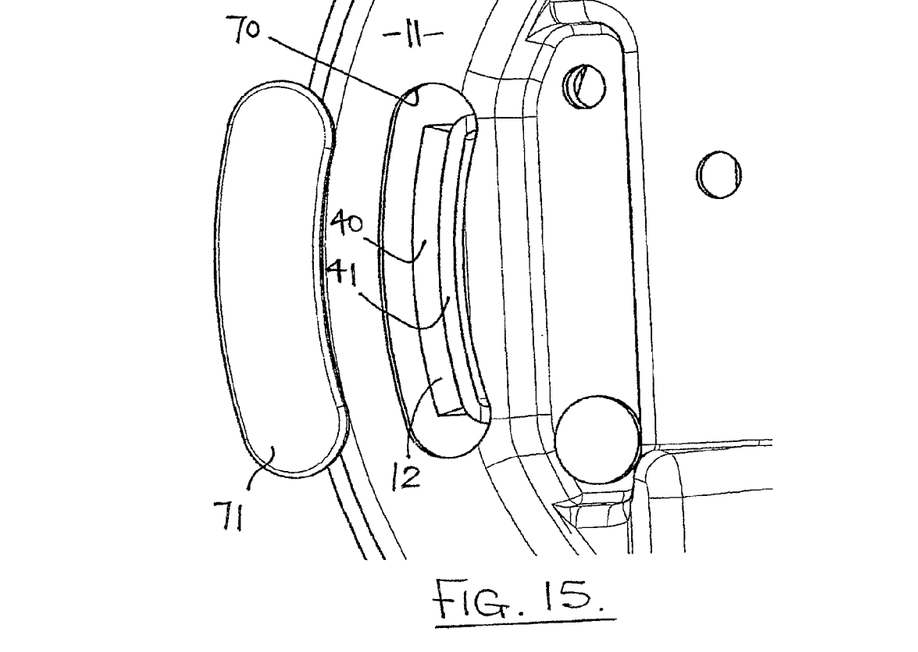
FIG. 15 shows details of an aperture in the back plate to allow easy removal of a brake pad in a brake of the present invention.

A brake in accordance with the present invention may be provided with an aperture 70 in the backplate 11 adjacent each brake pad 12 (see FIG. 15) to allow the brake pad to be removed through the backplate in the direction generally perpendicular to the backplate for servicing/replacement of the pads. Each of these apertures 70 is preferably provided with a cover 71 of plastics material which can be inserted in position in the aperture 70.

Figure 16:
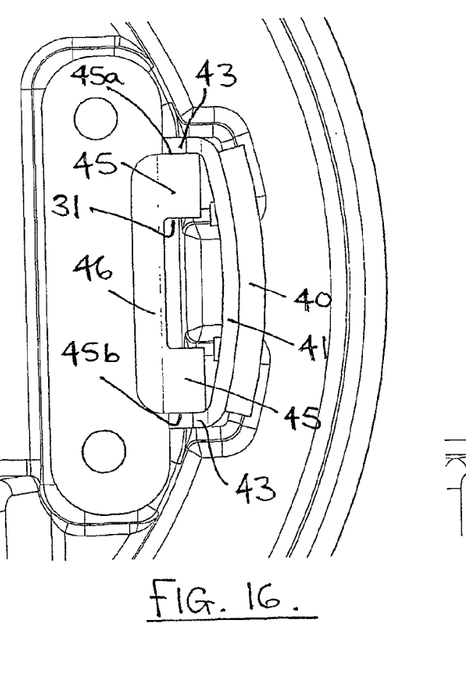
FIGS. 16 and 17 show alternative abutment arrangements for supporting a brake pad in a brake of the present invention.
Figure 17:
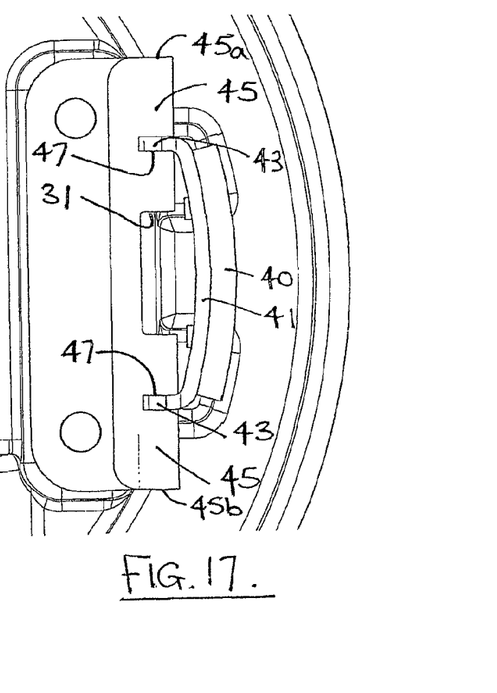

FIGS. 16 and 17 show alternative abutment structures for supporting the pads 12. In FIG. 16, the ears 43 of the pads are supported on external abutment surfaces 45a and 45b of the abutment portions 45 of the structure and these abutment portions 45 are again linked by portion 46 of the structure to resist displacements of the abutment portions when the braking torque is reacted.

In the FIG. 17 construction the ears 43 of the brake pads 12 are received in slots 47 of the abutment structure which are located in the abutment portions 45 intermediate the slot 31 through which the lever portions 14c extend and the external surfaces 45a, 45b of the abutment portions.

Figure 18:
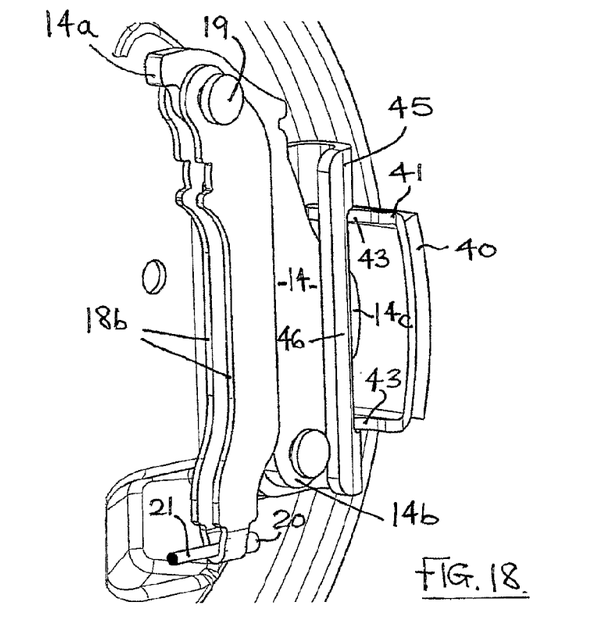
FIG. 18 shows a dual-limb type handbrake lever used in a brake in accordance with the present invention.

FIG. 18 shows an alternative handbrake lever which is of the dual-limb type in which the respective limbs 18b the handbrake lever extend on each side of the associated operating lever 14. The cable 21 and associated cable nipple 20 engaging between the limbs 18b as shown. Again, if required, any suitable form of the quick attach cable arrangement can be used such as that disclosed in the Applicants previously referred to patent EP 917630.

Figure 19:
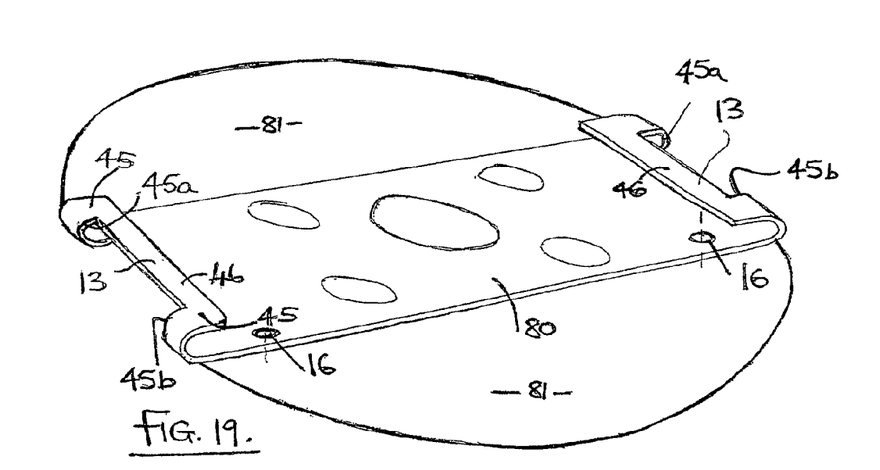
FIG. 19 shows diagrammatically an alternative backplate arrangement for a brake in accordance in the present invention.

FIG. 19 shows in diagrammatic form an alternative backplate arrangement in which the backplate comprises a main strip-like structural portion 80 on each end of which an abutment structure 13 is formed or secured with the bases of the U-shaped abutment structures facing away from each other. The remaining portion 81 of the backplate can be formed from a significantly thinner and less robust material since it is not required to resist the braking torque which is taken by the main strip-like structural support 80.

The invention claimed is:

1. A drum brake without brake pad retraction springs comprising:
a pair of brake pads, each pad being moveable generally radially outwardly into contact with a brake drum by a respective operating lever acted on at one end by a brake applying means and pivoted at the other end from a backplate, each pad being contacted by a portion of the respective operating lever that is intermediate to the lever ends and moving radially outwardly between a pair of circumferentially spaced abutments which extend generally perpendicular to the backplate, wherein when the brake is released, a constant pad to drum clearance is maintained solely by knock-back of the drum on the pads.

2. A drum brake according to claim 1 in which a handbrake lever is pivoted on one of the operating levers adjacent said one end thereof and a strut extends between said handbrake lever and said one end of the other operating lever so that pivoting of the handbrake lever relative to said one operating lever moves the other operating lever towards the brake pad that is associated with the other operating lever and thus, by reaction through the strut, also moves said one operating lever towards the brake pad that is associated with said one operating lever, thus applying the brake to provide a hand/parking brake function.

3. A drum brake according to claim 2 in which the strut is of variable effective length, the effective length of the strut being increased automatically if the movement of the handbrake lever necessary to supply the brake exceeds a predetermined distance thus moving the positions occupied by the operating levers when the brake is released towards the drum as the pads wear so that the maximum travel of the handbrake lever when the handbrake lever is actuated remains substantially constant throughout the life of the pads.

4. A drum brake according to claim 3 in which the automatic pad clearance adjuster operates during the application of the brake by the brake applying means.

5. A drum brake according to claim 3 in which the automatic pad clearance adjuster includes a temperature sensitive device which disables the operation of the adjuster at high temperatures to prevent over adjustment of the pad clearance.

6. A drum brake according to claim 1, in which one end of each circumferentially spaced abutment is supported from the backplate and the other free ends of the circumferentially spaced abutments are linked circumferentially to each other to brace the pair of abutments against relative circumferential deflection when the brake is applied.

7. A drum brake according to claim 1, in which each lever is pivoted on the backplate about a pin which extends generally perpendicular to the backplate, the free ends of the pins remote from the backplate being connected by a bracing link which helps to control the deflection of the pins relative to the backplate when the brake is applied.

8. A drum brake comprising:
brake pads,
two operating levers each associated with one of said brake pads,
a handbrake lever arranged for movement on a backplate in which the handbrake lever is pivoted on one end of one of the operating levers, and
a strut extends between said handbrake lever and the other operating lever so that pivoting of the handbrake lever relative to said one of the operating levers moves said other operating lever towards the brake pad that is associated with said other operating lever and thus, by reaction through the strut, also moves said one of the operating levers towards the brake pad that is associated with said one of the operating levers, thus applying the brake to provide a hand/parking brake function, wherein a pad to drum clearance is established without pad retraction springs solely by knock-back of the drum on the brake pads.

9. A drum brake according to claim 8 wherein the strut is of variable effective length, the effective length of the strut being increased automatically if the movement of the handbrake lever necessary to supply the brake exceeds a pre-determined distance thus moving the positions occupied by the operating levers when the brake is released towards the drum as the pads wear so that the maximum travel of the handbrake lever when the handbrake lever is actuated remains substantially constant throughout the life of the pads.

10. A drum brake according to claim 9 wherein an automatic pad clearance adjuster operates during the application of the brake by the brake applying means.

11. A drum brake according to claim 1, wherein the levers releasably contact their associated pads.

12. A drum brake according to claim 1, wherein the levers are disconnected from their associated pads.

13. A drum brake according to claim 1, wherein when the brake is released, the pads are not biased back toward each other by the levers.

* * * * *